United States Patent
Kim et al.

(10) Patent No.: US 10,056,622 B2
(45) Date of Patent: Aug. 21, 2018

(54) NANOTUBULAR INTERMETALLIC COMPOUND CATALYST FOR POSITIVE ELECTRODE OF LITHIUM AIR BATTERY AND METHOD OF PREPARING THE SAME

(71) Applicants: Hyundai Motor Company, Seoul (KR); POSTECH Academy-Industry Foundation, Pohang-si, Gyeongsangbuk-do (KR)

(72) Inventors: Won Keun Kim, Suwon-si (KR); Kyoung Han Ryu, Yongin-si (KR); Jin Woo Lee, Pohang-si (KR); Jae Hyuk Lee, Pohang-si (KR); Ji Hee Park, Pohang-si (KR); Joo Young Jeong, Pohang-si (KR)

(73) Assignees: HYUNDAI MOTOR COMPANY, Seoul (KR); POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 358 days.

(21) Appl. No.: 14/970,052

(22) Filed: Dec. 15, 2015

(65) Prior Publication Data
US 2017/0077523 A1 Mar. 16, 2017

(30) Foreign Application Priority Data
Sep. 16, 2015 (KR) .................. 10-2015-0130991

(51) Int. Cl.
*H01M 4/92* (2006.01)
*C23F 1/40* (2006.01)
(Continued)

(52) U.S. Cl.
CPC ............ *H01M 4/921* (2013.01); *C23F 1/40* (2013.01); *H01M 4/8652* (2013.01);
(Continued)

(58) Field of Classification Search
CPC .................. H01M 4/8878; H01M 4/921
(Continued)

(56) References Cited

U.S. PATENT DOCUMENTS

| 2007/0264560 | A1* | 11/2007 | Alexandrovichserov ............ B82Y 30/00 429/483 |
| 2011/0204297 | A1* | 8/2011 | Park ..................... H01B 1/24 252/503 |
| 2013/0130109 | A1* | 5/2013 | Archer ................. B82Y 30/00 429/213 |

FOREIGN PATENT DOCUMENTS

| JP | 2010-236133 | 10/2010 |
| JP | 2011-214074 | 10/2011 |

(Continued)

OTHER PUBLICATIONS

"Enhanced Cycling Stability of Hybrid Li-Air Batteries Enabled by Ordered Pd3Fe Intermetallic Electrocatalyst" by Zhiming Cui et al., Journal of the American Chemical Society, Published May 28, 2015, DOI: 10.1021/JACS.5b03865, J. Am. Chem. Soc. 2015, 137, pp. 7278-7281.

(Continued)

*Primary Examiner* — Basia Anna Ridley
*Assistant Examiner* — James M Erwin
(74) *Attorney, Agent, or Firm* — Brinks Gilson & Lione

(57) ABSTRACT

Disclosed is a nanotubular intermetallic compound catalyst for a positive electrode of a lithium air battery and a method of preparing the same. In particular, a porous nanotubular intermetallic compound is simply prepared using electrospinning in which a dual nozzle is used, and, by using the same as a catalyst, a lithium air battery having enhanced discharge capacity, charge/discharge efficiency and lifespan is provided.

11 Claims, 6 Drawing Sheets

(51) Int. Cl.
H01M 4/86 (2006.01)
H01M 4/88 (2006.01)
H01M 12/08 (2006.01)

(52) U.S. Cl.
CPC ......... H01M 4/886 (2013.01); H01M 4/8814 (2013.01); H01M 4/8875 (2013.01); H01M 4/8878 (2013.01); H01M 4/8882 (2013.01); H01M 4/8889 (2013.01); H01M 12/08 (2013.01); H01M 2004/8689 (2013.01); Y02E 60/128 (2013.01)

(58) Field of Classification Search
USPC ........................................................ 429/525
See application file for complete search history.

(56) References Cited

FOREIGN PATENT DOCUMENTS

| | | |
|---|---|---|
| JP | 5436528 | 12/2013 |
| JP | 2014107133 A | 6/2014 |
| KR | 10-0734181 | 7/2007 |
| KR | 10-1308740 | 9/2013 |
| KR | 10-2014-0058784 | 5/2014 |
| KR | 20140065515 A | 5/2014 |
| KR | 10-1490024 | 2/2015 |

OTHER PUBLICATIONS

Lu, Weili, et al.; CoSn/carbon Composite Nanofibers for Applications as Anode in Lithium-ion Batteries; J Nanopart Res (2013); pp. 1-11.

* cited by examiner

NANOTUBULAR INTERMETALLIC COMPOUND CATALYST FOR POSITIVE ELECTRODE OF LITHIUM AIR BATTERY AND METHOD OF PREPARING THE SAME

CROSS-REFERENCE TO RELATED APPLICATIONS

This application claims the benefit of and priority to Korean Patent Application No. 10-2015-0130991 filed Sep. 16, 2015, which is incorporated herein by reference in its entirety.

FIELD

The present disclosure relates to a nanotubular intermetallic compound catalyst for a positive electrode of a lithium air battery and a method of preparing the same.

BACKGROUND

The statements in this section merely provide background information related to the present disclosure and may not constitute prior art.

As solutions for fossil fuel depletion, high oil prices, etc. are sought, interest in energy storage technology for efficient energy usage is rapidly increasing.

Metal air batteries are batteries wherein a metal such as lithium (Li), zinc (Zn), aluminum (Al), magnesium (Mg), iron (Fe), calcium (Ca), sodium (Na), or the like is used as a negative electrode, and oxygen in the air is used as a positive electrode active material.

Metal air batteries may unlimitedly use oxygen in the air, thus having excellent energy density, compared to other secondary batteries. Thereamong, lithium air batteries using lithium (Li) as a negative electrode have theoretical energy density of about 3500 Wh/kg which is about 10 times higher than lithium ion batteries.

Hereinafter, an operation mechanism of a lithium air battery is described referring to Formulas 1 and 2 below.

When a lithium air battery is discharged, lithium metal of a negative electrode is oxidized, and thus, lithium ions and electrons are generated. Such lithium ions migrate to a positive electrode through an electrolyte, and the electrons migrate to a positive electrode through an exterior conductor or a current collector. In regard to the positive electrode, oxygen is supplied from external air. The supplied oxygen is reduced by the electrons, thus forming $Li_2O_2$.

In an opposite direction to this, charging of a lithium air battery proceeds. In a positive electrode, a lithium compound is decomposed and thus oxygen is generated. In a negative electrode, reduction of lithium ions occurs.

(Negative electrode): $Li \rightarrow Li^+ + e^-$     [Formula 1]

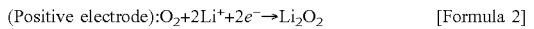

(Positive electrode): $O_2 + 2Li^+ + 2e^- \rightarrow Li_2O_2$     [Formula 2]

One task task of lithium air batteries is to address instability of batteries when charged under excessively high voltage during charge/discharge.

In a positive electrode of lithium air batteries, oxygen reduction reaction (ORR) occurs during charge, and oxygen evolution reaction (OER) occurs during discharge.

In current lithium air batteries, the speed of the oxygen reduction reaction (ORR) and the oxygen evolution reaction (OER) is low. Accordingly, electrons do not actively migrate in a battery and thus over-voltage during charge/discharge is higher than a theoretical voltage, which causes low energy efficiency (low charge/discharge efficiency).

Hereinafter, conventional technologies related to a catalyst that is used in an electrode of secondary batteries including lithium air batteries are described.

Korean Patent No. 10-1308740 relates to a preparation method of an intermetallic compound-including carbon nanofiber which may be used as a catalyst of lithium secondary batteries. In this case, a fiber-web catalyst may be provided and thus electrons may rapidly migrate, compared to a conventional case in which a particle phase is used. In addition, carbon nanofiber may be provided through a simple method, i.e., electrospinning. However, although a fiber web state is provided, a surface area thereof is not sufficient and thus a catalyst is not remarkably activated.

Korean Patent Laid-Open Publication No. 10-2014-0058784 relates to a positive electrode catalyst using a binary alloy for lithium air batteries. Here, two transition metals are prepared into an alloy to provide a catalyst having high activity to oxygen reduction reaction and oxygen evolution reaction. However, since the catalyst is a particle-type catalyst, a surface area is not wide and diffusion of a reactant is not good. In addition, since the catalyst is an alloy, performance of the catalyst is not consistent.

SUMMARY

The present disclosure provides a catalyst, for a positive electrode of a lithium air battery, which may increase discharge capacity due to high activity in oxygen reduction reaction and oxygen evolution reaction.

The present disclosure also provides a catalyst, for a positive electrode of a lithium air battery, which may enhance charge/discharge efficiency and lifespan by lowering a charge voltage.

Further, the present disclosure to provides a method of preparing a nanotube-shape catalyst using a method such as dual nozzle electrospinning, thereby increasing productivity and economic efficiency.

A catalyst for a positive electrode of a lithium air battery according to the present disclosure may be a nanotube-shape catalyst including an intermetallic compound that includes palladium (Pd) and a transition metal.

In one form of the present disclosure, the transition metal may be any one selected from the group consisting of Fe, Cu, Ir, Pb, Sn, Bi, Zn, Ge, Ga and Ce.

In one form of the present disclosure, the intermetallic compound may include palladium and transition metal in a molar ratio of 1:0.1 to 10.

In one form of the present disclosure, the nanotube-shape catalyst is porous and pores may be included in an inner side or a surface thereof.

In one form of the present disclosure, the diameter of the catalyst may be 250 to 350 nm.

In one aspect, the present disclosure provides a method of preparing a catalyst for a positive electrode of a lithium air battery, the method including (1) preparing a first solution including a palladium (Pd) precursor, a transition metal precursor and a polymer; (2) preparing a second solution including a silica precursor and a polymer; (3) preparing a nanowire composed of a shell part including palladium and a transition metal, and a core part including silica by electrospinning the first solution and the second solution through a dual nozzle; (4) removing the polymer by thermally treating the nanowire; (5) converting the palladium and the transition metal into an intermetallic compound by reducing the nanowire; and (6) forming a nanotube shape by etching the core part of the nanowire.

In one form of the present disclosure, the polymer may be any one selected from the group consisting of polyacrylonitrile, polyvinylpyrrolidone, polyfurfuryl alcohol, cellulose, glucose, polyvinylchloride, polyacrylic acidic, polylactic acid, polyethylene oxide, polypyrrole, polyimide, polyamideimide, polybenzylimidazole, polyaniline, phenolic resin and pitch.

In one form of the present disclosure, the first solution may include polyacrylonitrile as the polymer, and the palladium precursor and the transition metal precursor in an amount of 1 to 3% by weight, wherein the polyacrylonitrile is included in an amount of 10 to 14% by weight.

In one form of the present disclosure, the second solution may include polyvinylpyrrolidone, as the polymer, in an amount of 7 to 10% by weight and the silica precursor in an amount of 7 to 9% by weight.

In one form of the present disclosure, the first solution and the second solution may use, as a solvent, any one selected from the group consisting of N,N-dimethylformamide (DMF), dimethylacetamide (DMAc), tetrahydrofuran (THF), dimethylsulfoxide (DMSO), gamma-butyrolactone, N-methylpyrrolidone, chloroform, toluene and acetone.

In one form of the present disclosure, the reducing in the converting (5) may be performed by thermally treating the nanowire under a mixed gas atmosphere including hydrogen and nitrogen.

In one form of the present disclosure, in the forming (6), the core part may be wet-etched using a sodium hydroxide solution.

In one form of the present disclosure, in the forming (6), pores may be formed in an inner side and a surface of the nanotube by etching the core part.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 briefly illustrates a reference view of a method of preparing a catalyst for a positive electrode of a lithium air battery according to the present disclosure;

Figure 1:
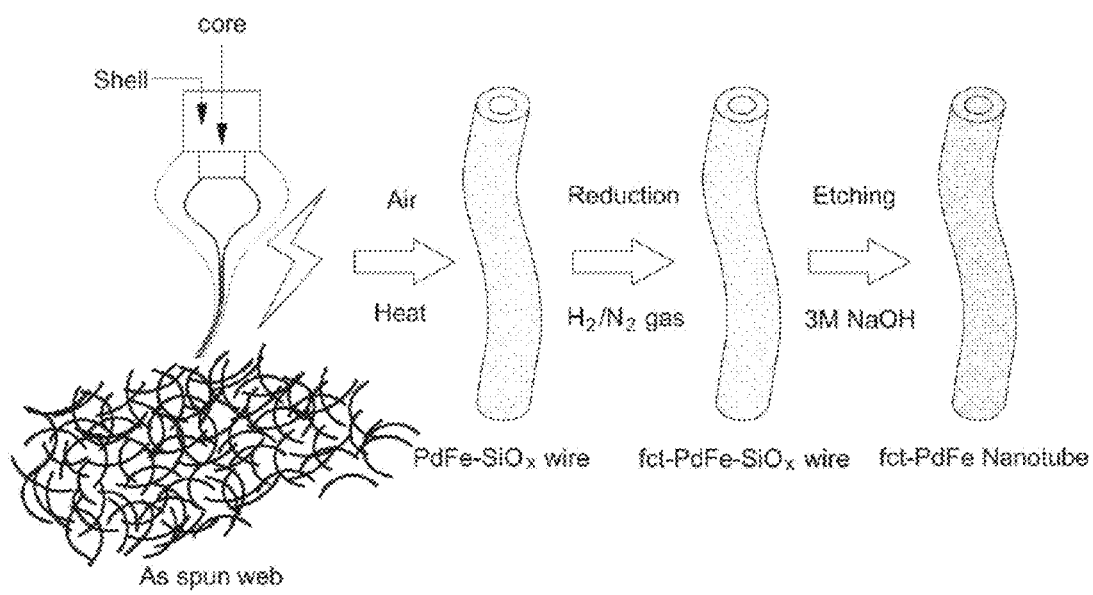

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Since over-voltage mostly occurs in a positive electrode upon charge/discharge of a lithium air battery, performance of a lithium air battery is heavily dependent upon reaction efficiency of a positive electrode. Therefore, improvement in a positive electrode will enhance performance of a lithium air battery.

During discharge, lithium and oxygen meet in a positive electrode of a lithium air battery, and thus, lithium oxide is generated. During charge, the lithium oxide is decomposed, and thus, lithium and oxygen are generated. That is, generation and decomposition of lithium oxide, i.e., reversible reaction, occur. When the reversible reaction is smoothly performed, over-voltage does not occur. A catalyst for a positive electrode of a lithium air battery facilitates generation and decomposition of the lithium oxide.

The present disclosure relates to a catalyst for a positive electrode of a lithium air battery and a method of preparing the same.

A catalyst for a positive electrode of a lithium air battery according to the present disclosure may be a nanotube-shape catalyst including an intermetallic compound that includes palladium (Pd) and a transition metal.

The catalyst exhibits high activity in oxygen reduction reaction (ORR) and oxygen evolution reaction (OER). Accordingly, the catalyst may decrease over-voltage during charge/discharge by facilitating oxygen reaction in a positive electrode.

The catalyst may be an intermetallic compound including palladium (Pd) and a transition metal or an intermetallic compound including platinum (Pt) and a transition metal. However, in regard to economic efficiency and activity of a catalyst, the intermetallic compound including palladium and a transition metal may be used.

The transition metal may be any one selected from the group consisting of Fe, Cu, Ir, Pb, Sn, Bi, Zn, Ge, Ga and Ce.

The catalyst may be "an intermetallic compound" including palladium (Pd) and the transition metal.

The intermetallic compound denotes a compound including two or more metals and having a regular atomic structure. Accordingly, all unit cells of the intermetallic compound have the same metal atom and arrangement thereof.

In the present disclosure, the intermetallic compound should be distinguished from a "metal alloy." The metal alloy has an irregular atomic structure unlike that of the intermetallic compound. In the metal alloy, metal atoms are randomly arranged. That is, unit cells of the metal alloy have different metal atoms and arrangement thereof.

Since the intermetallic compound has a regular atomic structure, consistent catalyst performance may be exhibited. That is, the catalyst for a positive electrode of a lithium air battery according to the present disclosure may facilitate reversible reaction (generation and decomposition of lithium oxide) occurring in a positive electrode at a consistent speed. Accordingly, stability and lifespan of a lithium air battery are enhanced. When the speed of the reversible reaction is not consistent, a positive electrode may be strained due to difference between the speeds, which may negatively effect on stability and lifespan of a lithium air battery.

In the intermetallic compound, palladium and the transition metal may be included in a molar ratio of 1:0.1 to 10. When activity of the catalyst is considered, a molar ratio of palladium to the transition metal may be particularly 1:1.

The catalyst may have a nanotube shape. In general, a catalyst used in a secondary battery has a particle shape, a nanorod shape, a nanowire shape, or the like. The catalyst according to the present disclosure has a nanotube shape, thereby having a wider surface area than conventional catalysts and smoothly diffusing a reactant.

The catalyst has a nanotube shape and, in an inner side and a surface of the nanotube, pores are included, and thus the catalyst may be porous. Accordingly, a surface area is further extended and thus many reaction sites may be provided, thereby maximizing effects of the catalyst.

The catalyst may have a diameter of 250 to 350 nm and a length of 1 to 100 μm. In addition, the catalyst may have pores having a diameter of 1 to 180 nm. When the size of the catalyst is included within the above numerical ranges, a material may satisfactorily diffuse to the catalyst. Accordingly, the lithium oxide is formed in a higher ratio in an inner side or a surface of the catalyst (nanotube), thereby maximizing effects of the catalyst.

A method of preparing a catalyst for a positive electrode of a lithium air battery according to the present disclosure may include (1) preparing a first solution including a palladium (Pd) precursor, a transition metal precursor and a polymer; (2) preparing a second solution including a silica precursor and a polymer; (3) preparing a nanowire composed of a shell part including palladium and a transition metal, and a core part including silica by electrospinning the first solution and the second solution through a dual nozzle; (4) removing the polymer by thermally treating the nanowire; (5) converting the palladium and the transition metal into an intermetallic compound by reducing the nanowire; and (6) forming a nanotube shape by etching the core part of the nanowire.

Referring to FIG. 1, a method of preparing the catalyst according to the present disclosure is briefly described.

In order to prepare the catalyst according to the present disclosure, first, electrospinning is performed. First, a voltage of several kV is applied to a precursor solution standing, by surface tension, on a tip of a dual nozzle. Accordingly, the precursor solution is solidified and exhibits a nanowire shape.

Since the nanowire is prepared using a dual nozzle, a shell part may be composed of palladium and a transition metal, and a core part may be composed of silica. That is, the nanowire has a core-shell shape. Accordingly, in heating and reduction steps performed after electrospinning, the shape of the nanowire may be satisfactorily maintained. In addition, in a final etching step, a nanotube shape may be easily formed by removing a core part.

In order to use electrospinning in which a dual nozzle is used, the viscosity of a precursor solution is important. Detailed descriptions thereof are given below.

The shape of the nanowire is established through a subsequent heating step, and the shell part is converted into the intermetallic compound including palladium and the transition metal through a reducing step.

Finally, the nanowire is prepared into a nanotube shape by etching the core part. Here, when the core part is etched, pores are formed in an inner side and a surface of the nanotube, and thus the nanotube has porosity.

Hereinafter, each step of the method of preparing the catalyst according to the present disclosure is described in detail.

Step (1) is a step of preparing a first solution introduced into a shell part of the dual nozzle, and the step (2) is a step of preparing a second solution introduced into a core part of the dual nozzle.

The first solution may be prepared by dissolving a palladium (Pd) precursor, a transition metal precursor and a polymer in a solvent.

As the palladium (Pd) precursor, any compounds including palladium may be used, and, particularly, palladium chloride may be used.

As described above, the transition metal precursor may be a precursor of any one selected from the group consisting of Fe, Cu, Ir, Pb, Sn, Bi, Zn, Ge, Ga and Ce.

The second solution may be prepared by dissolving a silica precursor and a polymer in a solvent.

The silica precursor is converted into silica through thermal treatment of step (4), and the silica functions as a template of a nanowire. In addition, the silica may be easily removed through wet etching, as described below, and thus, a nanotube-shape catalyst may be easily obtained.

As the silica precursor, any compounds including silica (Si) may be used, and, particularly, tetraethyl orthosilicate (hereinafter referred to as TEOS) may be used.

The solvent may be any one selected from the group consisting of N,N-dimethylformamide (DMF), dimethylacetamide (DMAc), tetrahydrofuran (THF), dimethylsulfoxide (DMSO), gamma-butyrolactone, N-methylpyrrolidone, chloroform, toluene and acetone.

The polymer is a composition increasing the viscosities of the first solution and the second solution. In order to use electrospinning, the viscosity of precursor solutions should be high. Furthermore, since a dual nozzle is used in the method of preparing the catalyst according to the present disclosure, it is impossible to form a nanowire shape when the viscosities of the first solution and the second solution are not properly controlled.

The polymer may be any one selected from the group consisting of polyacrylonitrile, polyvinylpyrrolidone, polyfurfuryl alcohol, cellulose, glucose, polyvinylchloride, polyacrylic acidic, polylactic acid, polyethylene oxide, polypyrrole, polyimide, polyamideimide, polybenzylimidazole, polyaniline, phenolic resin and pitch.

According to one form of the present disclosure, in the first solution of step (1), the palladium precursor may be palladium chloride and the transition metal precursor may be iron chloride hexahydrate.

The viscosity of the first solution may be increased by using polyacrylonitrile (hereinafter referred to as PAN) having a molecular weight of 150,000 g/mol as a polymer. 1 to 3% by weight of the palladium precursor and transition metal precursor, and 10 to 14% by weight of PAN may be dissolved in 80 to 90% by weight of N,N-dimethylformamide (hereinafter referred to as DMF), as a solvent, such that the first solution has viscosity suitable for electrospinning.

A molar ratio of the palladium precursor to the transition metal precursor may be 1:0.1 to 10, particularly 1:1. Accordingly, an intermetallic compound prepared through a subsequent reduction treatment also includes palladium and the transition metal in the above molar ratio.

According to one form of the present disclosure, in step (2), the silica precursor of the second solution may be tetraethyl orthosilicate (TEOS).

The viscosity of the second solution may be increased by using polyvinylpyrrolidone (hereinafter referred to as PVP) having a molecular weight of 1,300,000 g/mol as a polymer. 7 to 9% by weight of the silica precursor and 7 to 10% by weight of PVP are dissolved in 80 to 90% by weight of DMF as a solvent such that the second solution has suitable viscosity for electrospinning.

Step (3) is a step of manufacturing a nanowire by electrospinning the first solution and the second solution through a dual nozzle.

The first solution and the second solution are introduced into a dual nozzle by an automatic syringe pump at a constant rate. After standing the first solution and the second solution on a tip of the dual nozzle, a voltage of 10.5 to 11.5 kV is applied thereto. The first solution and the second solution are changed into a Taylor cone shape by high voltage and prepared into a nanowire shape through stretching.

The diameter of the nanowire may be 80 to 320 nm. When it is considered that the diameter is decreased through a subsequent heating step, it is preferable to perform electrospinning.

The nanowire is divided into a shell part composed of palladium and transition metal and a core part composed of silica. Subsequently, the shell part is converted into an intermetallic compound, thereby functioning as a catalyst. The core part is a template of the nanowire and enables the nanowire to maintain a core-shell structure in heating and reducing steps.

Step (4) is a step of removing the polymer by heating the nanowire. According to removal of the polymer, the diameter of the nanowire is decreased to 250 to 350 nm.

In addition, the silica precursor of the core part is converted into silica through the heating. In this case, a portion of the silica precursor is vaporized and migrates from a core part to a shell part. In the shell part, the portion of the silica precursor is converted into silica. Accordingly, in a subsequent etching step, silica moved to the shell part is also removed together, and thus, pores are formed in the shell part, thereby obtaining a porous nanotube.

Particularly, the heating may be performed at 500 to 600° C. under an oxygen atmosphere. When heating is performed within this temperature range, the polymer may be completely removed and a portion of the silica precursor may migrate to a shell part.

Step (5) is a step of converting palladium and the transition metal into an intermetallic compound by reducing the nanowire.

A palladium-transition metal oxide phase of the shell part of the nanowire is converted into an intermetallic compound phase of palladium-transition metal through the reducing. In particular, during reducing, the oxide phase reacts with hydrogen, thereby being converted into a palladium-transition metal alloy and water. In addition, the alloy having irregular metal arrangement is converted into an intermetallic compound having a regular arrangement at high temperature.

Detailed descriptions of the intermetallic compound are the same as those described above, thereby being omitted to avoid repetition.

The reducing may be performed by heating to 550 to 650° C. under a mixed gas ($H_2/N_2$ gas) atmosphere including hydrogen and nitrogen. When the reducing is performed within the temperature range, the intermetallic compound of the palladium-transition metal may be prepared.

Step (6) is a step of preparing a catalyst into a nanotube shape by etching the core part of the nanowire.

The nanowire treated through step (5) has a core-shell structure including a shell part composed of the intermetallic compound of the palladium-transition metal and some silica moved from the core part, and a core part composed of silica.

Silica of the nanowire may be removed by wet-etching through reaction with a sodium hydroxide (NaOH) solution.

As silica of the core part is removed, the catalyst may be prepared into a nanotube shape. In this case, some silica included in the shell part is removed together and pores may be formed in an inner side and a surface of the nanotube.

As such, according to the method of preparing the catalyst for a positive electrode of a lithium air battery of the present disclosure, the nanotube-shape catalyst may be easily prepared by using electrospinning in which a dual nozzle is used. The nanotube-shape catalyst smoothly diffuses a reactant in the positive electrode. Accordingly, a charge voltage of a battery may be lowered, and thus, charge/discharge efficiency and lifespan may be enhanced.

In addition, according to the method of preparing the catalyst for a positive electrode of a lithium air battery of the present disclosure, pores are formed in an inner side and a surface of a nanotube, and thus, the catalyst may have porosity. Accordingly, a surface area of the catalyst is extended, and thus, a catalyst exhibiting higher activity than other catalyst types may be provided.

In addition, according to the method of preparing the catalyst for a positive electrode of a lithium air battery of the present disclosure, the nanotube-shape catalyst may be easily prepared without an additional carrier or support. Accordingly, productivity and economic efficiency of the catalyst may be enhanced.

Furthermore, since electrospinning is used in the method of preparing the catalyst for a positive electrode of a lithium air battery according to the present disclosure, various materials may be selectively used and thus the method may be applied to, other than palladium, other materials such as platinum (Pt), and thus the method has high applicability.

The following examples illustrate the present disclosure and are not intended to limit the same.

EXAMPLES

1) Preparation Step of First Solution

Palladium chloride as a palladium precursor and iron chloride hexahydrate as a transition metal precursor were used.

PAN having a molecular weight of 150,000 g/mol was used as a polymer and DMF was used as a solvent.

The palladium precursor and the transition metal precursor were mixed in a molar ratio of 1:1, thereby preparing a metal precursor.

2% by weight of the metal precursor, 12% by weight of PAN and 86% by weight of DMF were mixed, thereby preparing a first solution.

(2) Preparation Step of Second Solution

TEOS as a silica precursor, PVP having a molecular weight of 1,300,000 g/mol as a polymer and DMF as a solvent were used.

8% by weight of the silica precursor, 10% by weight of PVP and 82% by weight of DMF were mixed, thereby preparing a second solution.

(3) Electrospinning Step

The first solution was injected into a shell part of a dual nozzle at a speed of 0.3 me/h, and the second solution was injected into a core part at a speed of 0.18 me/h. Here, the first solution and the second solution were injected using an automatic syringe pump.

The first solution and the second solution were stood on a tip of a dual nozzle by surface tension and then a voltage of 11 kV was applied thereto. Accordingly, a nanowire having a core-shell structure was formed and the nanowire was collected.

(4) Heating Step

The collected nanowire was heated to 550° C. under an oxygen atmosphere, and thus, PAN and PVP were removed.

(5) Reduction Step

The heated nanowire was heated to 600° C. under a mixed gas ($H_2/N_2$ gas) atmosphere including 4% hydrogen/nitrogen, and thus, the shell part was converted into an intermetallic compound of palladium-iron (PdFe).

(6) Etching Step

A core part of the reduced nanowire was etched using a 3 M sodium hydroxide (NaOH) solution. Accordingly, a nanotubular palladium-iron (PdFe) intermetallic compound catalyst was obtained.

(7) Lithium Air Battery Cell Manufacture Step

A cathode including the catalyst was manufactured. The catalyst, Super-P carbon particles and polyvinyl difluoride (hereinafter referred to as PVDF) binder were mixed in a mass ratio of 5:6:1. The resultant mixture was dissolved in N-methylpyrrolidone (hereinafter referred to as NMP) as a solvent and stirred for 24 hours. A carbon paper substrate was impregnated with the resultant mixture and drying was performed, thereby completing a cathode. In the cathode, the amount of the catalyst with respect to the carbon paper was 1 mg/cm$^2$.

A lithium air battery cell includes the cathode, an electrolyte and a negative electrode. As the electrolyte, lithium trifluoromethanesulfonate (LiTFSi)-tetraethyleneglycol dimethyl ether (TEGDME) (LiTFSi:TEGDME=1:4) was used. As the negative electrode, lithium foil having a purity of 99.99% was used. A glass filter as a separator was used to prevent electrical short of the cathode and the negative electrode.

Comparative Example 1

A nanoparticle-shape palladium-iron (PdFe) intermetallic compound catalyst was prepared.

(1) Precursor Solution Preparation Step

Palladium chloride as a palladium precursor and iron chloride hexahydrate as a transition metal precursor were used.

PAN having a molecular weight of 150,000 g/mol was used as a polymer, and DMF was used as a solvent.

The palladium precursor and the transition metal precursor were mixed in a molar ratio of 1:1, thereby preparing a metal precursor.

2% by weight of the metal precursor, 9% by weight of PAN and 89% by weight of DMF were mixed, thereby preparing a precursor solution.

(2) Electrospinning Step

The precursor solution was injected into a single nozzle at a speed of 0.16 me/h. The precursor solution was stood on a tip of the single nozzle by surface tension, and then, a voltage of 12 kV was applied thereto. Accordingly, nanoparticles were formed and collected.

(3) Heating Step

The collected nanoparticles were heated to 550° C. under an oxygen atmosphere to remove PAN.

(4) Reduction Step

The heated nanoparticles were heated to 600° C. under a 4% mixed gas ($H_2/N_2$ gas) atmosphere including hydrogen and nitrogen, thereby being converted into a palladium-iron (PdFe) intermetallic compound. Accordingly, a nanoparticle-shape palladium-iron (PdFe) intermetallic compound catalyst was obtained.

(5) Lithium Air Battery Cell Manufacture Step

Using the nanoparticle-shape palladium-iron (PdFe) intermetallic compound catalyst, a lithium air battery cell was manufactured in the same manner as in the cell manufacture step of Example.

Comparative Example 2

A lithium air battery cell was manufactured in the same manner as in the cell manufacture step of Example, except that a cathode included only Super-P carbon particles and a binder without an intermetallic compound catalyst.

Experimental Example 1

Figure 2:
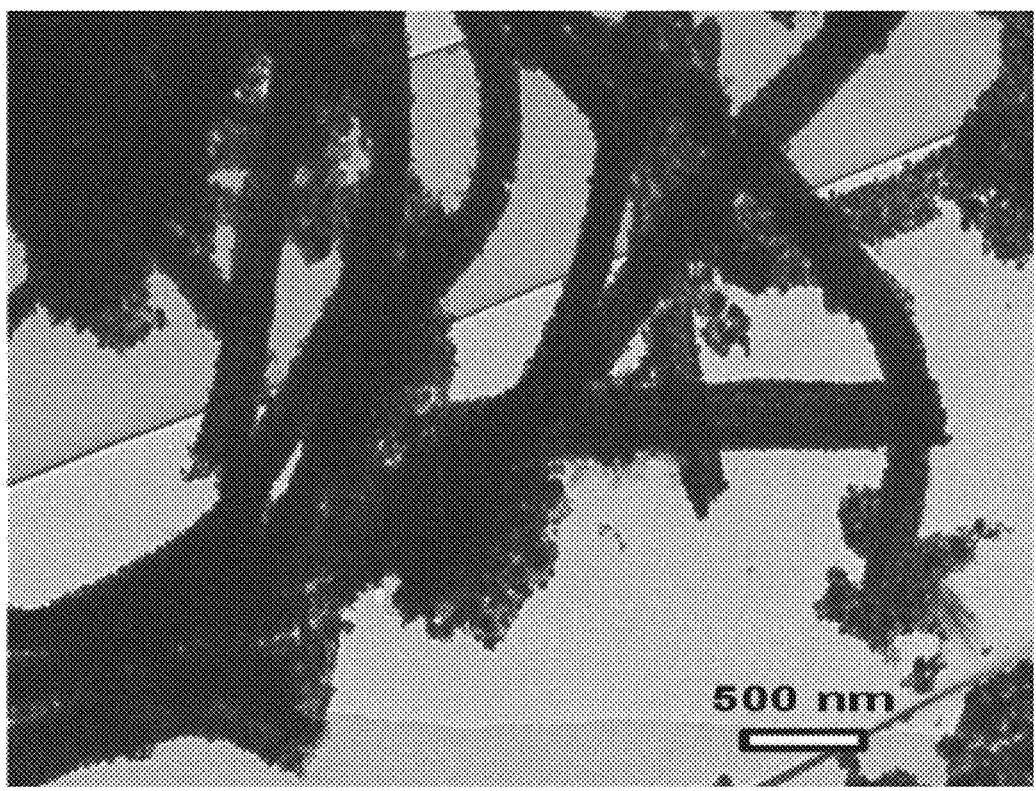
FIG. 2 illustrates a transmission electron microscope (TEM) image of a catalyst prepared according to an example of the present disclosure.

FIG. 2 illustrates a transmission electron microscope (TEM) image of the catalyst for a positive electrode of a lithium air battery according to Example.

Referring to this, it can be confirmed that the catalyst has a nanotube shape and many pores were formed in an inner side and a surface of the nanotube, and thus the nanotube was porous. Accordingly, when the catalyst preparation method of the present disclosure is used, a porous nanotube-shape catalyst for a positive electrode of a lithium air battery may be prepared.

Figure 3:
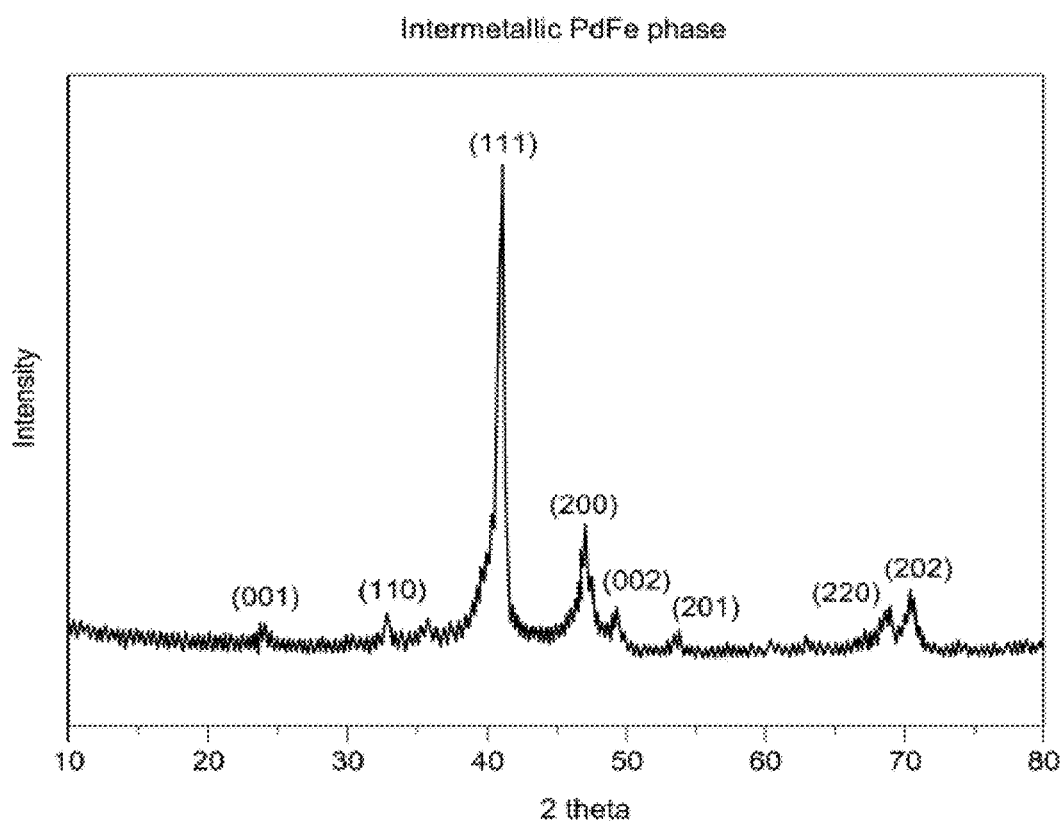
FIG. 3 illustrates an XRD (X-Ray Diffraction) pattern of a catalyst prepared according to an example of the present disclosure.

FIG. 3 illustrates an XRD pattern of the catalyst for a positive electrode of a lithium air battery according to Example.

Referring to this, it can be known that, by analyzing d-spacing in the XRD pattern, the catalyst exhibits superlattice peaks, i.e., (001) and (110), of PdFe. That is, this shows that the catalyst is an intermetallic compound having a regular atomic structure of Pd and Fe. That is, it can be confirmed that an intermetallic compound catalyst may be prepared according to the catalyst preparation method of the present disclosure.

Experimental Example 2

Discharge capacity, charge voltage and lifespan of each of the lithium air battery cells according to Example and Comparative Examples 1 and 2 were measured.

A gas line was connected to the lithium air battery cell, and battery characteristics were observed while passing oxygen gas therethrough. As a device for charge/discharge experiments, WBCS-3000 available from Wonatech was used. Voltage changes were observed under constant current.

(1) Discharge Capacity Measurement of Cell

Figure 4:
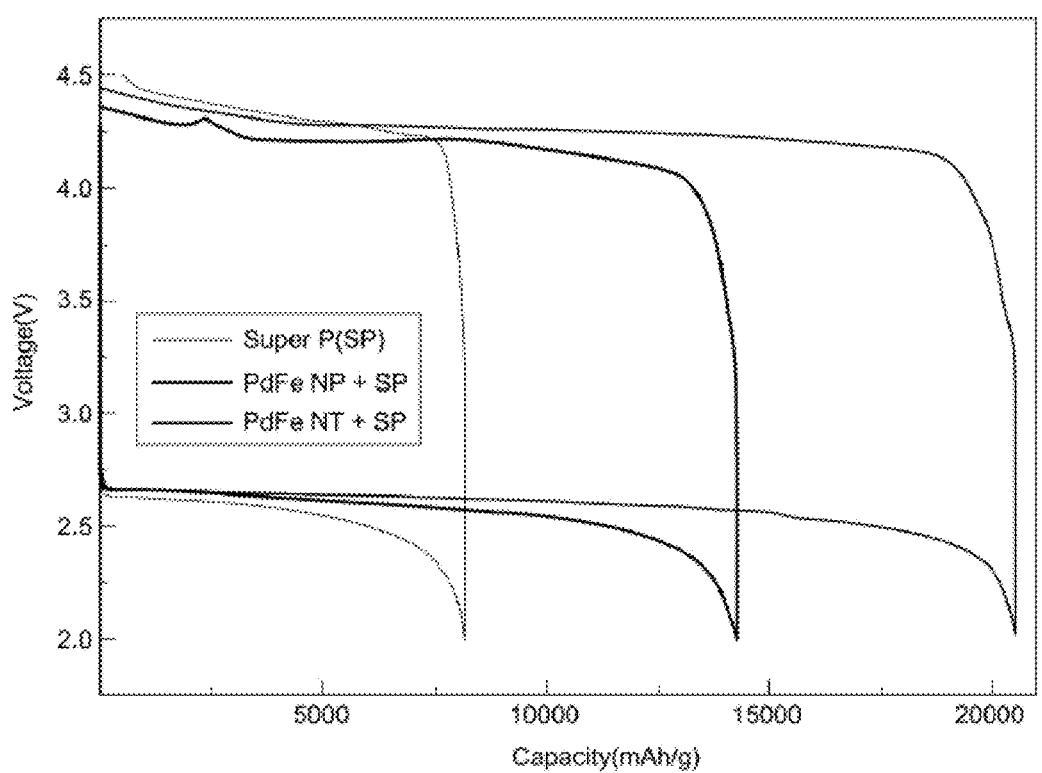
FIG. 4 illustrates discharge capacity measurement results of cells manufactured according to an example, and Comparative Examples 1 and 2 of the present disclosure.

The cells according to Example, and Comparative Examples 1 and 2 were charged/discharged under a current density intensity (charge/discharge speed) of 500 mA/g and voltage limitation conditions of 2.0 V and 4.5 V with respect to lithium, and the discharge capacities thereof were measured. Results are illustrated in FIG. 4.

Referring to this, discharge capacities in Comparative Example 2, Comparative Example 1 and Example are 8,173 mAh/g, 14,296 mAh/g and 20,536 mAh/g, respectively. That is, the discharge capacity of the nanotubular PdFe intermetallic compound catalyst according to Example is greatly enhanced, compared to those of Comparative Examples 1 and 2. This may be interpreted as being caused by enhanced material diffusion in the positive electrode due to the nanotube-shape catalyst.

(2) Charge Voltage Measurement of Cell

Figure 5:
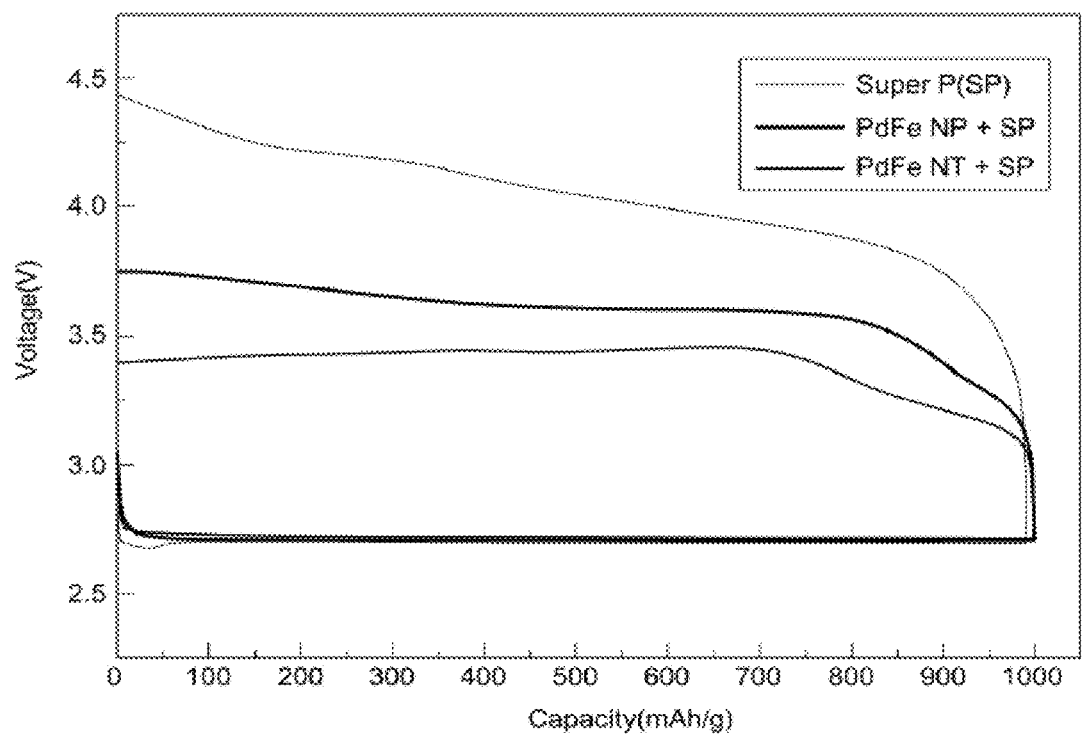
FIG. 5 illustrates charge voltage measurement results of cells manufactured according to an example, and Comparative Examples 1 and 2 of the present disclosure.

The cells according to Example, and Comparative Examples 1 and were charged/discharged under conditions of a current density intensity (charge/discharge speed) of 200 mA/g and a capacity limitation of 1000 mAh/g, and charge voltages thereof were measured. Results are illustrated in FIG. 5.

Referring to this, charge voltages of Comparative Example 2, Comparative Example 1 and Example were 3.88 V, 3.57 V and 3.34 V, respectively. The nanotubular PdFe intermetallic compound catalyst according to Example exhibits further decreased charge voltage, compared to the nanoparticle-shape PdFe intermetallic compound catalyst according to Comparative Example 1. This may be interpreted as occurring because the nanotube-shape catalyst facilitates diffusion of a material surrounding the same, compared to the nanoparticle catalyst, and thus, lithium oxide is formed near and inside a nanotube during discharge. That is, a distance to the catalyst is decreased as the lithium oxide is formed near the nanotube, and thus, reaction may be more easily facilitated, and thus a charge voltage of Example is lowest.

(3) Lifespan (Cycle) Measurement of Cell

Figure 6:
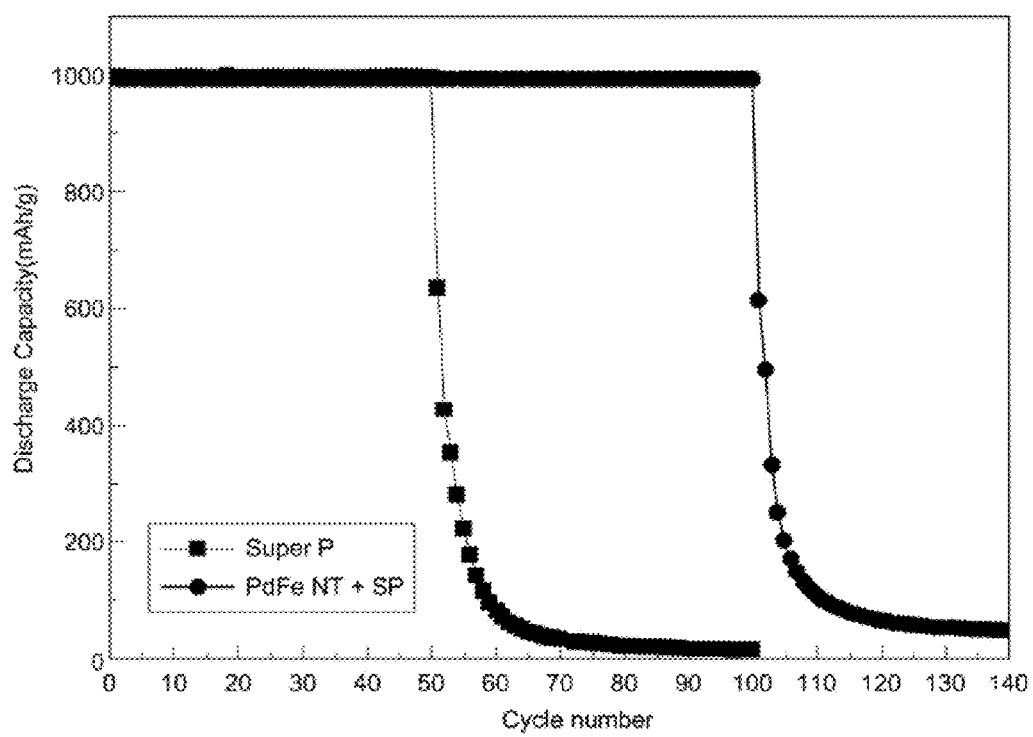
FIG. 6 illustrates lifespan measurement results of cells manufactured according to an example and Comparative Example 2 of the present disclosure.

Cells according to Example and Comparative Example 2 were charged/discharged under conditions of a current density intensity (charge/discharge speed) of 500 mA/g, a capacity limitation of 1000 mAh/g and a voltage limitation condition of 2.0-4.5 V, and lifespan thereof was measured. Results are illustrated in FIG. 6.

Referring to this, lifespan in Comparative Example 2 is 50 cycles, but lifespan in Example is enhanced to 100 cycles. This may be interpreted as occurring because charge voltage of the cell according to Example is decreased and thus decomposition of an electrolyte and electrodes as side reactions which may occur during charge/discharge is decreased.

As described above, the catalyst for a positive electrode of a lithium air battery according to the present disclosure and the method of preparing the same include the above compositions, thereby having the following effects.

The catalyst for a positive electrode of a lithium air battery according to the present disclosure includes palladium (Pd) and the transition metal exhibiting high activity in oxygen reduction reaction and oxygen evolution reaction, and thus, discharge capacity of a battery may be enhanced.

The catalyst for a positive electrode of a lithium air battery according to the present disclosure is an intermetallic compound including palladium (Pd) and the transition metal, and thus, consistent catalyst performance may be maintained.

According to the method of preparing the catalyst for a positive electrode of a lithium air battery of the present disclosure, the nanotube-shape catalyst may be easily prepared by using electrospinning in which a dual nozzle is used. The nanotube-shape catalyst facilitates diffusion of a reactant in a positive electrode. Accordingly, charge voltage of a battery may be lowered, and thus, charge/discharge efficiency and lifespan may be enhanced.

According to the method of preparing the catalyst for a positive electrode of a lithium air battery of the present disclosure, pores are formed in an inner side and a surface of the nanotube, and thus, the catalyst may have porosity. Accordingly, a surface area of the catalyst is extended, and thus, a catalyst exhibiting higher activity than other catalyst types may be provided.

According to the method of preparing the catalyst for a positive electrode of a lithium air battery of the present disclosure, the nanotube-shape catalyst may be easily prepared without an additional carrier or support. Accordingly, productivity and economic efficiency of the catalyst may be enhanced.

Electrospinning is used in the method of preparing the catalyst for a positive electrode of a lithium air battery according to the present disclosure, and thus, various materials may be selectively used. Accordingly, the method may be applied to, other than palladium, materials such as platinum (Pt), and thus the method has high applicability.

Effects of the present disclosure are not limited to the above effects. It will be understood that effects of the present disclosure include all effects that can be construed by the following descriptions.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of preparing a catalyst for a positive electrode of a lithium air battery, the method comprising:
   preparing a first solution comprising a palladium (Pd) precursor, a transition metal precursor and a polymer;
   preparing a second solution comprising a silica precursor and a polymer;
   preparing a nanowire composed of a shell part comprising palladium and a transition metal, and a core part comprising silica by electrospinning the first solution and the second solution through a dual nozzle;
   removing the polymer by thermally treating the nanowire;
   converting the palladium and the transition metal into an intermetallic compound by reducing the nanowire; and
   forming a nanotube shape by etching the core part of the nanowire.

2. The method according to claim 1, wherein the transition metal is selected from the group consisting of Fe, Cu, Ir, Pb, Sn, Bi, Zn, Ge, Ga and Ce.

3. The method according to claim 1, wherein the polymer is selected from the group consisting of polyacrylonitrile, polyvinylpyrrolidone, polyfurfuryl alcohol, cellulose, glucose, polyvinylchloride, polyacrylic acid, polylactic acid, polyethylene oxide, polypyrrole, polyimide, polyamideimide, polybenzylimidazole, polyaniline, phenolic resin and pitch.

4. The method according to claim 1, wherein the first solution comprises polyacrylonitrile as the polymer, and
   the palladium precursor and the transition metal precursor in an amount of 1 to 3% by weight,
   wherein the polyacrylonitrile is contained in an amount of 10 to 14% by weight.

5. The method according to claim 1, wherein the second solution comprises polyvinylpyrrolidone as the polymer, and
   the silica precursor in an amount of 7 to 9% by weight,
   wherein the polyvinylpyrrolidone is contained in an amount of 7 to 10% by weight.

6. The method according to claim 1, wherein the first solution and the second solution use a solvent selected from the group consisting of N,N-dimethylformamide (DMF), dimethylacetamide (DMAc), tetrahydrofuran (THF), dimethylsulfoxide (DMSO), gamma-butyrolactone, N-methylpyrrolidone, chloroform, toluene and acetone.

7. The method according to claim 1, wherein the reducing in the converting is performed by thermally treating the nanowire under a mixed gas atmosphere comprising hydrogen and nitrogen.

8. The method according to claim 1, wherein the intermetallic compound comprises the palladium and the transition metal in a molar ratio of 1:0.1 to 10.

9. The method according to claim 1, wherein, in the forming, the core part is wet-etched using a sodium hydroxide solution.

10. The method according to claim 1, wherein, in the forming, pores are formed in an inner side and a surface of the nanotube by etching the core part.

11. The method according to claim 1, wherein a diameter of the catalyst is 250 to 350 nm.

* * * * *